United States Patent

[11] 3,575,427

| [72] | Inventors | Edward F. Lapac<br>West Hartford;<br>Byron H. Shinn, Bolton, Conn. |
|---|---|---|
| [21] | Appl. No. | 873,226 |
| [22] | Filed | Nov. 3, 1969 |
| [45] | Patented | Apr. 20, 1971 |
| [73] | Assignee | United Aircraft Corporation<br>East Hartford, Conn. |

[54] COMPOSITE ABRADABLE SEAL
3 Claims, 2 Drawing Figs.

[52] U.S. Cl. .................................................. 277/96
[51] Int. Cl. ..................................................... F16j 15/34
[50] Field of Search .................. 161/(Microballoon Digest);
277/96, (MD Digest)

[56] References Cited
UNITED STATES PATENTS

| 3,000,846 | 9/1961 | Runton et al. .............. | 277/96 |
| 3,339,933 | 9/1967 | Foster .......................... | 277/96 |
| 3,519,282 | 7/1970 | Davis ........................... | 277/96 |

Primary Examiner—Robert I. Smith
Attorney—James A. Kane

ABSTRACT: An abradable type seal for turbomachinery which utilizes a composite material consisting of a resilient bonding material and a friable insert construction to achieve the desired abradability.

This application is reportable as a Subject Invention under Government Contract AF 33(657)14903.

Patented April 20, 1971

3,575,427

INVENTORS
EDWARD F. LAPAC
BYRON H. SHINN
BY James Q. Kane
ATTORNEY

COMPOSITE ABRADABLE SEAL

BACKGROUND OF THE INVENTION

This invention relates to an abradable sealing construction for a turbomachine, and more particularly to a composite material which has the desired abradability to reduce undesired tip leakage.

In turbomachines such as axial flow compressors and turbines, the overall operating efficiency is adversely affected by leakage of the working fluid around the tips of the rotating airfoils. This is a particularly difficult dimension to control and a typical approach of controlling this dimension by the prior art constructions has been the use of abradable sealing materials. Typically, the abradable coating is applied to the engine stator casing, thus permitting the rotor blades to seat against the stator assembly with what is essentially zero clearance.

Unfortunately, however, the abradable materials employed in the prior art constructions have been unsatisfactory in providing a suitable abradable seal material capable of use in a gas turbine engine, particularly in the new high Mach number turbojet engines. Specifically, materials suitable for abradable seals must be readily penetrated by the rotating blade, or knife edge of the blade, with little or no knife edge wear and yet withstand engine operating temperatures and erosive hot gases. The abradable seal material hereinafter described has these characteristics.

SUMMARY OF THE INVENTION

It is a primary object of this invention to provide an abradable sealing material for use in a turbomachine.

As has previously been stated, to provide an abradable type seal for a turbomachine that reduces the gap or tip leakage while producing a labyrinth path at the rotor blade tip, the abradable material must be of a kind that is readily penetrated by the rotating blade or knife edge with little or no wear on the rotating member. This foregoing requirement has been satisfied by the use of a composite abradable seal material consisting of a friable material which is bonded together by a resilient bonding material.

In achieving the composite abradable seal material hereinafter described in greater detail, it was determined that a critical relationship existed between the friable material and the resilient bonding material. This occurs principally because abradability is increased by decreasing the material density and increasing the porosity or by using a heterogeneous friable material. However, each of these factors reduces the bond strength of the coating and the resistance of the material to erosion.

The composite abradable seal material of the present invention is one that utilizes a friable insert of hollow glass spheres. These glass spheres comprise 20±5 percent by weight, of the overall material content, and it is extremely critical that this amount of friable material is present in the composite material. This results for any amount of friable material over 25 percent by weight produces a weak friable coating, while anything less than 15 percent by weight produces rubbery material which is not sufficiently abradable.

DESCRIPTION OF THE PREFERRED EMBODIMENT

Figure 1:
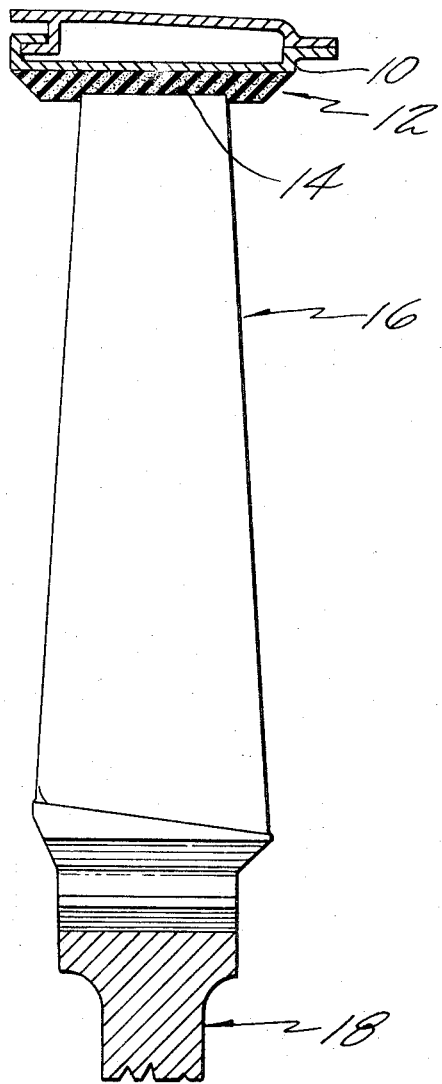
FIG. 1 is a fragmentary sectional view of a compressor section of a gas turbine engine embodying the material of the present invention.

Referring to FIG. 1, a portion of an engine compressor is illustrated. Compressor casing 10 includes a layer or coating of composite seal material 12. Seal material 12 is readily penetrated or abraded by blade tip 14 of compressor blade 16, blade 16 being supported for rotation by conventional means on rotor wheel 18. Composite seal material 12 and blade tip 14 establish and control the blade tip clearance. More specifically, if blade tip 14 or a knife edge on the blade tip not shown herein, contacts seal material 12 during high-temperature operation or during adverse operating conditions the knife edge or blade tip 14 will penetrate seal 12. Since the seal 12 is abradable the blade tip leakage path or gap 20 can be controlled so as to not adversely effect compressor operating efficiency.

Figure 2:
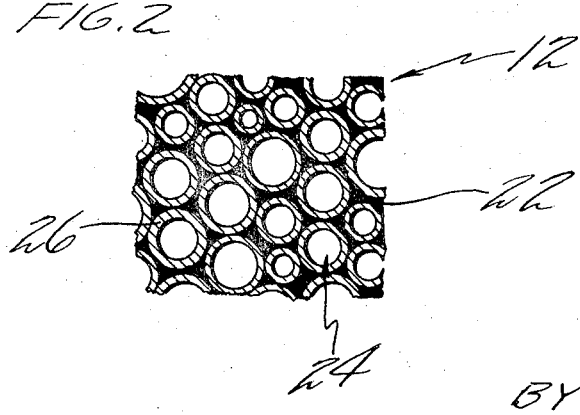
FIG. 2 is an enlarged sectional view of illustrating the composite structure of the present invention.

The composite structure of seal material 12 is illustrated in FIG. 2. As shown, the composite seal includes a resilient bonding agent 22, and friable insert 24. As hereinbefore noted, the relationship between the resilient bonding material 22 and the friable insert are critical.

Friable insert 24 consists of a plurality of glass spheres 26, preferably hollow and preferably each of the spheres having a diameter of between 10 to 300 microns. It has been determined that a friable insert of hollow glass spheres which comprises 20±5 percent by weight of the composite seal structure contains the proper coating strength and abradability to be used in a gas turbine engine. If the friable insert of hollow glass spheres comprised over 25 percent by weight, of the overall composite seal material, it has been determined that a weak friable coating is produced. Whereas, if the glass spheres comprised less than 15 percent by weight of the seal material, then the material produced is too rubbery and would not have the desired abradability.

The resilient bonding agent which comprises 80±5 percent by weight of the composite seal material may be any communically available silicone rubber, the actual agent not being a part of the present invention.

We claim:

1. An abradable-type fluid seal for a turbomachine, the turbomachine including two members capable of relative rotational movement, at least one of said members having an abradable rubbing contact area wherein the improvement comprises;

the abradable rubbing contact area consisting of a mixture of essentially, by weight, 20 ± 5 percent of a friable material and 80 ± 5 percent of a resilient bonding material; said friable material being a plurality of hollow glass members dispersed throughout the resilient bonding material.

2. An abradable-type fluid seal as in claim 1 wherein; the hollow glass members are spherical in shape.

3. An abradable-type fluid seal as in claim 1 wherein; the diameter of each of the hollow glass spheres is in the range of 10 to 300 microns.